(No Model.)
J. H. POLLOK.
PROCESS OF CHLORINATING GOLD ORES.
No. 415,060. Patented Nov. 12, 1889.
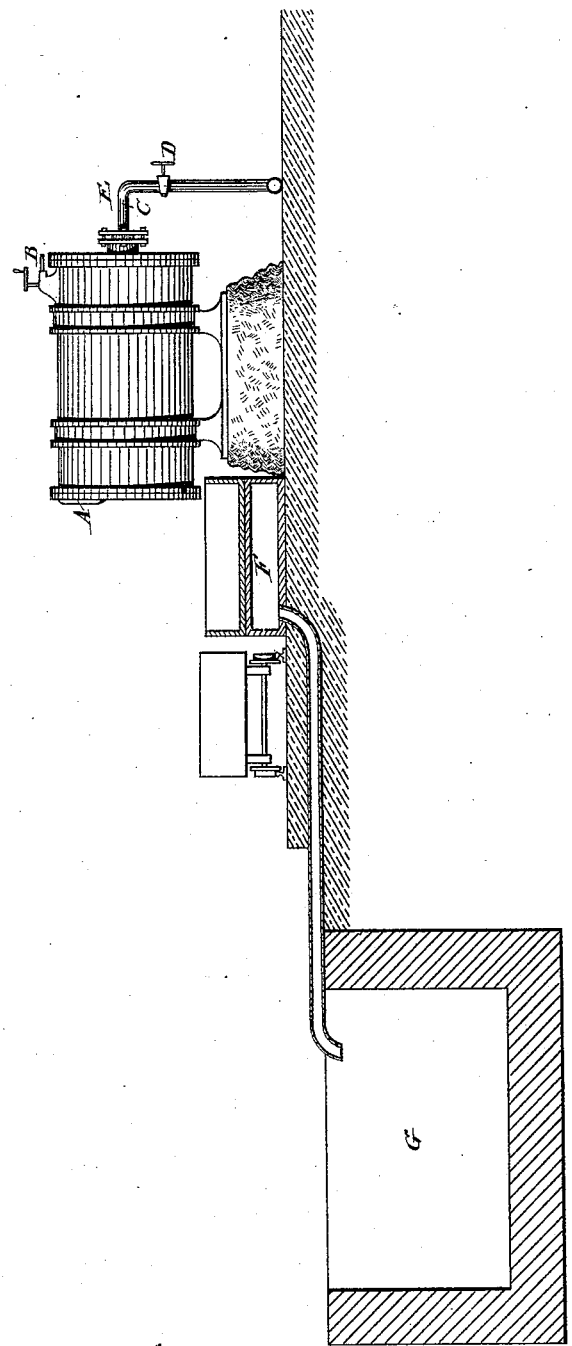

UNITED STATES PATENT OFFICE.

JAMES HOLMS POLLOK, OF GLASGOW, COUNTY OF LANARK, SCOTLAND.

PROCESS OF CHLORINATING GOLD ORES.

SPECIFICATION forming part of Letters Patent No. 415,060, dated November 12, 1889.

Application filed May 1, 1889. Serial No. 309,270. (No model.)

*To all whom it may concern:*

Be it known that I, JAMES HOLMS POLLOK, B. Sc., of the University of Glasgow, in the county of Lanark, North Britain, assistant to the professor of chemistry in the said university, have invented an Improved Process of Chlorinating Gold Ores, of which the following is a specification.

The invention consists in chlorinating gold ores by means of chlorine or chlorine-generating agents under hydraulic pressure in closed vessels, from which air is expelled, excluded, or removed. The use of hydraulic pressure has great advantage over chlorine-pressure alone, or air-and-chlorine pressure, for by its means a much higher pressure is readily obtained and can be steadily maintained throughout the whole operation, whereby the chlorine is all retained in solution and this strong chlorinating-liquid is forced into the pores of the ore, the ore having been previously rendered porous by roasting. If chlorine alone be used, it is difficult to get a pressure of more than forty pounds per square inch, and absolutely impossible to get more than sixty pounds, for chlorine liquefies at that point, whereas by hydraulic means any desired degree of pressure can be obtained, though one hundred and twenty pounds per square inch is found to be most suitable for the effectual, rapid, and economical treatment of roasted ores. If air-pressure be used, it is possible to get as high a pressure, but more difficult, owing to the loss of efficiency of air-pumps. Air has the additional disadvantage of wasting chlorine, for, in accordance with Dalton's well-known law of diffusion of gases, the chlorine will remain diffused throughout the air-space to quite as great an extent as if the air were not compressed at all, and no matter to what extent such air may be compressed; hence the advantage of having no air present, for by this means all the chlorine is kept in solution, and is thus of value for the purpose of dissolving gold.

I have found the following mode of procedure well adapted to the successful practicing of my invention.

The ore is first crushed to a fineness such as would pass through wire-gauze of about four hundred mesh per square inch, and roasted in the usual manner. It is then placed in a revolving-cylinder (see accompanying drawing) made of steel, with suitable lining— such as lead, wood, or stoneware—to preserve it from corrosion.

A is a charging-aperture; B, an air-escape and chlorine blow-off valve; C, the hydraulic pipe passing to an accumulator supplying water at or about one hundred and twenty pounds, and connected to the cylinder by means of a packing-box, which, while it keeps the pipe perfectly tight, leaves the cylinder free to revolve; D, a valve on the hydraulic pipe for turning the water supply and pressure off and on. At the point E, inside the pipe and beyond the packing-box, is an automatic india-rubber valve, which, while it admits of the free flow of water into the cylinder, prevents any ore or solution from finding its way back into the hydraulic pipe.

F is the filter, and G a tank or vat. With the ore is placed in the cylinder about one per cent. of bleaching-powder and one and one-half per cent. of bisulphate of soda, these being added the one before and the other after the ore, so as to prevent them mixing until the cylinder is filled with water and the air expelled. So soon as the ore and reagents are placed in the cylinder the cover is screwed on the charging-aperture A, and the valve B is opened. Then the valve D is also opened, when water rushes in, expelling the air by B. Whenever the cylinder is full and water begins to flow from B, it is closed and the cylinder caused to revolve without closing the valve D, the accumulator or other water-forcing device thereby exerting its pressure on the contents of the cylinder, driving the liquid now containing all the chlorine in solution into the pores of the ore. At the end of from thirty minutes to one hour the revolution of the cylinder is stopped, the valve D closed, and the valve B connected with a pipe leading to vats containing slaked lime and opened, whereby the excess of chlorine is blown off and recovered. The cover is then removed from the charging-aperture and the ore and solution poured out onto the filter. The solution as it filters through is run into tanks, where the gold is precipitated by ferrous sulphate or other suitable precipitant and collected in the usual way.

The chief advantages of my improvements are that they enable practically the whole of the gold present in "refractory" ores to be extracted in a shorter time and at less cost than by any method at present known to me.

Having now distinctly stated the nature of my invention, the advantages arising from the same, and a manner in which it can be conveniently practiced, I desire to let it be distinctly understood that I am well aware that it is not new to chlorinate gold ores under chlorine-gas or air pressure. In particular I am aware of the patent of DeLacy Victoria, August 25, 1864, No. 748/749, in which he states, "with the aid of heat and pressure I cause the gold contained in the substance to be operated on to be dissolved. I force chlorine gas by means of a force-pump, bellows, gasometer, or other contrivance, into the vessel containing the auriferous material under process," and he operated in a vessel kept revolving. I am also aware that a similar process was patented by J. Howell Mears, in the United States, No. 195,381, dated September 18, 1877. I am further aware that the addition of air-pressure was patented by Newberry and Vautin, in Great Britain, in March, 1887. I therefore disclaim all these features, all of which have certain objections which are removed or overcome by my improvements.

What I claim is—

The process of extracting gold from ore, which consists in confining such ore with chlorine or chlorine-generating agents in a vessel, forcing water into the said vessel and completely expelling the air, closing the said vessel, and continuing the steady application of hydraulic pressure to the said vessel throughout the operation, substantially as and for the purposes set forth.

In witness whereof I have hereunto set my hand in the presence of two witnesses.

JAMES HOLMS POLLOK.

Witnesses:
JOHN LIDDLE,
ARTHUR HARTLY YUILE,
*Both of 154 St. Vincent Street, Glasgow.*